Figure 1:
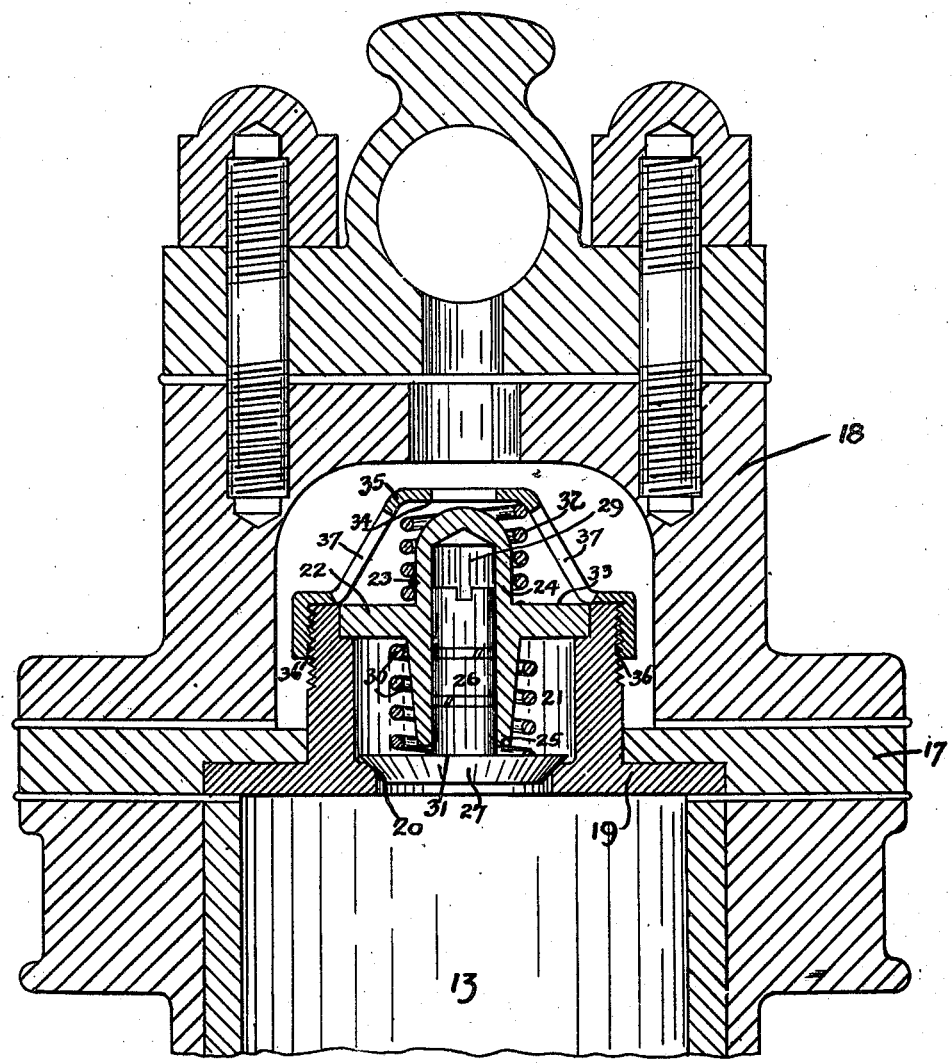

Nov. 25, 1924.

W. C. DEVER

VALVE

Filed July 26, 1923

1,516,846

WILLIAM C. DEVER
INVENTOR

ATTORNEYS

Patented Nov. 25, 1924.

1,516,846

UNITED STATES PATENT OFFICE.

WILLIAM C. DEVER, OF DETROIT, MICHIGAN, ASSIGNOR TO KELVINATOR CORPORATION, OF DETROIT, MICHIGAN, A CORPORATION OF DELAWARE.

VALVE.

Application filed July 26, 1923. Serial No. 653,915.

*To all whom it may concern:*

Be it known that I, WILLIAM C. DEVER, a citizen of the United States, residing at Detroit, in the county of Wayne and State of Michigan, have invented a certain new and useful Improvement in Valves, of which the following is a full, clear, and exact description, reference being had to the accompanying drawings.

Figure 2:
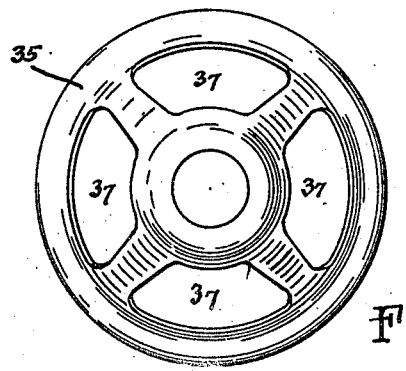

My invention relates to valve mechanism and particularly to valve mechanism for use in gas compressors. In these compressors it is desirable to provide means by which the discharge valve from the compressor may open an abnormal amount to readily discharge any accumulated non-refrigerant and in this way prevent undue pressure and strain upon the compressor chamber and associated parts. In providing such means in such compressors it has been found best to mount the valve in a movable support held stationary under normal conditions by a heavy spring compressed between the support and the head of the compressor but arranged to yield under abnormal pressure to permit abnormal opening of the valve. This construction has been found generally satisfactory yet in many cases it has been found that the spring becomes wedged or otherwise displaced while the compressor head is being positioned and accordingly fails to operate satisfactorily. My invention is designed to overcome this difficulty. In the drawings accompanying this specification and forming a part thereof I have shown, for purposes of illustration, one form of my invention. In these drawings:

Figure 1 represents a section through a compressor showing this illustrative form of my invention, while Figure 2 is a plan view of the device used to hold the spring in position.

In the drawings I have shown a compressor cylinder 13 to which is secured, in any suitable manner, an outlet duct comprising a valve plate 17 and a casing 18. Clamped between this plate 17 and the cylinder 13 is a valve housing 19 comprising a valve seat 20 and a tube 21 arranged to slidably support a spider 22 forming an integral part of a valve mounting 23 which comprises in addition to the spider 22 a cylindrical portion 24, open at its lower end 25 to receive the valve stem 26 of a valve 27 adapted to seat in the valve seat 20 of the plate 17, and closed at its upper end 28 to form with the valve stem 26 a chamber 29 adapted to act as a dash pot to cushion the movement of the valve 27 relative to the valve mounting 23. The valve 27 is biased to closed position by a relatively light spring 30 and limited in its opening movement by engagement of its upper face 31 with the lower end 25 of the tube 24 while the entire valve mounting 23 is biased to valve closing position by a relatively strong spring 32 compressed between the upper face 33 of the spider 22 and the lower face 34 of a cap 35 which overlies the valve mechanism, is screw-threaded to the tube 21 at 36, and is provided with a plurality of apertures 37 to permit upward movement of the spider 22.

It will be apparent from the above description that the valve 27 is free to open a normal amount in response to any pressure sufficient to overcome the relatively light spring 30, that this movement is limited by the engagement of the upper face 31 of the valve 27 with the lower end 25 of the tube 24 of the valve mounting 23, that further opening movement of the valve 27 is possible by upward movement of the entire valve mounting 23 in response to pressure sufficient to overcome the action of the relatively strong spring 32, and that movement of the valve 27 relative to the valve mounting 23 is cushioned in both directions so that hammering of the upper face 31 of the valve 27 against the lower end of the tube 24 and of the valve 27 against the seat 20 is entirely prevented. It will also be apparent from the above description that the entire valve mechanism may be assembled on the plate 19 before it is inserted into the compressor and accordingly at a time when the relation of the parts is clearly visible and when the action of the assembled valve may be tested. It will therefore be apparent that the construction herein disclosed prevents the insertion of the valve into the compressor in an inoperative or partially inoperative condition.

Those skilled in the art will recognize that various modifications in construction may be made without departing from the essence of my invention and accordingly this disclosure is illustrative only and my invention is not limited thereto.

I claim:

1. In combination, a compressor cylinder having a valve seat, a valve housing mounted on said cylinder, a valve mounting reciprocable in said valve housing, a valve reciprocable in said valve mounting and arranged to seat in said valve seat, a spring biasing said valve into seating position, a cap screw-threaded to the upper portion of said valve housing, and a compression spring tensioned between the upper face of said valve mounting and the lower face of said cap acting to move said valve mounting in valve seating direction.

2. In combination, a valve seat, a valve housing, a valve mounting reciprocable in said valve housing, a valve reciprocable in said valve mounting and arranged to seat in said valve seat, a spring biasing said valve into seating position, a cap screw-threaded to the upper portion of said valve housing, and a compression spring tensioned between the upper face of said valve mounting and the lower face of said cap acting to move said valve mounting in valve seating direction.

3. In combination, a compressor cylinder having a valve seat, a valve housing mounted on said cylinder, a valve mounting reciprocable in said valve housing, a valve reciprocable in said valve mounting and arranged to seat in said valve seat, a spring biasing said valve into seating position, a cap screw-threaded to the upper part of said valve housing, and a spring tensioned between said valve mounting and said cap acting to move said valve mounting in valve seating direction.

4. In combination, a valve seat, a valve housing, a valve mounting reciprocable in said valve housing, a valve reciprocable in said valve mounting and arranged to seat in said valve seat, a spring biasing said valve into seating position, a cap screw-threaded to the upper portion of said valve housing, and a spring tensioned between said valve mounting and said cap acting to move said valve mounting in valve seating direction.

5. In combination, a valve seat, a valve housing, a valve mounting reciprocable in said valve housing, a valve reciprocable in said valve mounting and arranged to seat in said valve seat, a spring biasing said valve into seating position, a cap carried by said valve housing, and a compression spring tensioned between the upper face of said valve mounting and the lower face of said cap acting to move said valve mounting in valve seating direction.

6. In combination, a compressor cylinder having a valve seat, a valve housing mounted on said cylinder, a valve mounting reciprocable in said valve housing, a valve reciprocable in said valve mounting and arranged to seat in said valve seat, a spring biasing said valve into seating position, a cap carried by said valve housing, and a compression spring tensioned between the upper face of said valve mounting and the lower face of said cap acting to move said valve mounting in valve seating direction.

7. In combination, a valve seat, a valve housing, a valve mounting reciprocable in said valve housing, a valve reciprocable in said valve mounting and arranged to seat in said valve seat, a spring biasing said valve into seating position, a cap carried by said valve housing, and a spring tensioned between said valve mounting and said cap acting to move said valve mounting in valve seating direction.

8. In combination, a compressor cylinder having a valve seat, a valve housing mounted on said cylinder, a valve mounting reciprocable in said valve housing, a valve reciprocable in said valve mounting and arranged to seat in said valve seat, a spring biasing said valve into seating position, a cap carried by said valve housing, and a spring tensioned between said valve mounting and said cap acting to move said valve mounting in valve seating direction.

9. In combination, a valve seat, a valve arranged to seat therein, a valve mounting reciprocably supporting said valve, a spring biasing said valve into seated position, a valve housing reciprocably supporting said valve mounting, a cap carried by said valve housing, and a spring tensioned between said cap and said valve mounting acting to move said valve mounting in valve closing direction.

In testimony whereof, I hereunto affix my signature.

WILLIAM C. DEVER.